United States Patent [19]

Sato

[11] Patent Number: 5,435,917
[45] Date of Patent: Jul. 25, 1995

[54] ROTARY FILTER COMPRISING A SCREEN DRUM AND INTERNAL SCREW MEMBER

[75] Inventor: Hachiro Sato, Tokyo, Japan

[73] Assignee: Fukoku Kogyo Co. Ltd., Tokyo, Japan

[21] Appl. No.: 890,079

[22] Filed: May 29, 1992

[30] Foreign Application Priority Data

Dec. 20, 1991 [JP] Japan .................. 3-355107

[51] Int. Cl.⁶ .............................. B01D 33/06
[52] U.S. Cl. ................... 210/374; 210/377; 210/394; 210/403; 209/270; 209/284; 209/288; 209/296
[58] Field of Search ............... 210/402–405, 210/374, 377, 394; 209/288, 290, 270, 284, 240, 250, 257, 267, 296, 297, 298, 293

[56] References Cited

U.S. PATENT DOCUMENTS

| | | | |
|---|---|---|---|
| 1,594,999 | 8/1926 | Carter | 210/403 |
| 1,712,258 | 5/1929 | Compain | 210/394 |
| 2,089,215 | 8/1937 | Lomax | 210/394 |
| 4,368,125 | 1/1983 | Murray | 210/374 |
| 5,030,348 | 7/1991 | Bengt | 210/403 |

FOREIGN PATENT DOCUMENTS 1427413 11/1970 German Dem. Rep. .
52551 of 1922 Sweden .

Primary Examiner—Robert A. Dawson
Assistant Examiner—Robert James Popovics
Attorney, Agent, or Firm—Varndell Legal Group

[57] ABSTRACT

A rotary filter for filtering water out of water containing raw material such as fish guts and muds including a screw drum having a number of filtering holes formed therein and a screw having a shaft and a spiral vane secured to the outer surface of the shaft, in which the screen drum is arranged rotatably, the screw is arranged within the screen drum rotatably relative to the screen drum, and the screen drum and the screw are rotated by means of separate driving sources independently from each other. A period of time during which the water containing raw material is remained within the screen drum can be adjusted at will regardless of the rotation speed of the screen drum. Therefore, the screen drum can be rotated at a high speed while the raw material can remained within the screen drum for a long time period, so that the water filtering efficiency can be increased.

5 Claims, 1 Drawing Sheet

ROTARY FILTER COMPRISING A SCREEN DRUM AND INTERNAL SCREW MEMBER

BACKGROUND OF THE INVENTION

1. Field of the Invention

The present invention relates to a rotary filter for filtering or separating water out of water containing raw material such as fish guts and muds.

3. Description of the Related Art Statements

A rotary filter has been known and has been described in Japanese Utility Model Publication No. 55-9425. In the known rotary filter, a screen plate is shaped into a drum to form a screen drum and the screen drum is rotated. Water containing raw material is supplied into the screen drum from its one end and water-extracted raw material is taken out of the screen drum from its other end. By rotating the screen drum, the water is filtered out of the raw material due to the centrifugal force. Therefore, in order to increase the filtering efficiency, the screen drum has to be rotated at a higher speed.

In another known rotary filter, a screw having a spiral vane is fixedly arranged within the screen drum such that the screw is rotated together with the screen drum. In such a known rotary filter having the screen drum and the screw, the screen drum and the screw are rotated together with each other, and thus when the rotating speed is increased, the raw material is promptly discharged from the rotary filter while the water is not sufficiently filtered out. Therefore, in the known rotary filter, the water filtering efficiency could not be made high.

SUMMARY OF THE INVENTION

The present invention has for its object to provide a novel and useful rotary filter, in which the water filtering efficiently can be adjusted at will by rotating the screen drum and the screw independently from each other.

According to the invention, a rotary filter for filtering water out of water containing raw material comprises:

a screen drum arranged rotatably and having first and second ends;

a screw arranged rotatably within said screen drum for transporting the water containing raw material from the first end to the second end of the screen drum;

a first driving means for rotating said screen drum; and a second driving means for rotating said screw.

In the rotary filter according to the invention, a period of time during which the raw material is remained within the screw drum can be adjusted at will by controlling the rotation speed of the screw, so that the water filtering efficiency can be increased by increasing the rotation speed of the screen drum. Further, when the raw material is moved within the screen drum by rotating the screw, there is produced a resistance which promotes the extraction of water from the raw material, so that the water filtering efficiency is further improved.

DETAILED EXPLANATION OF THE PREFERRED EMBODIMENT

Figure 1:
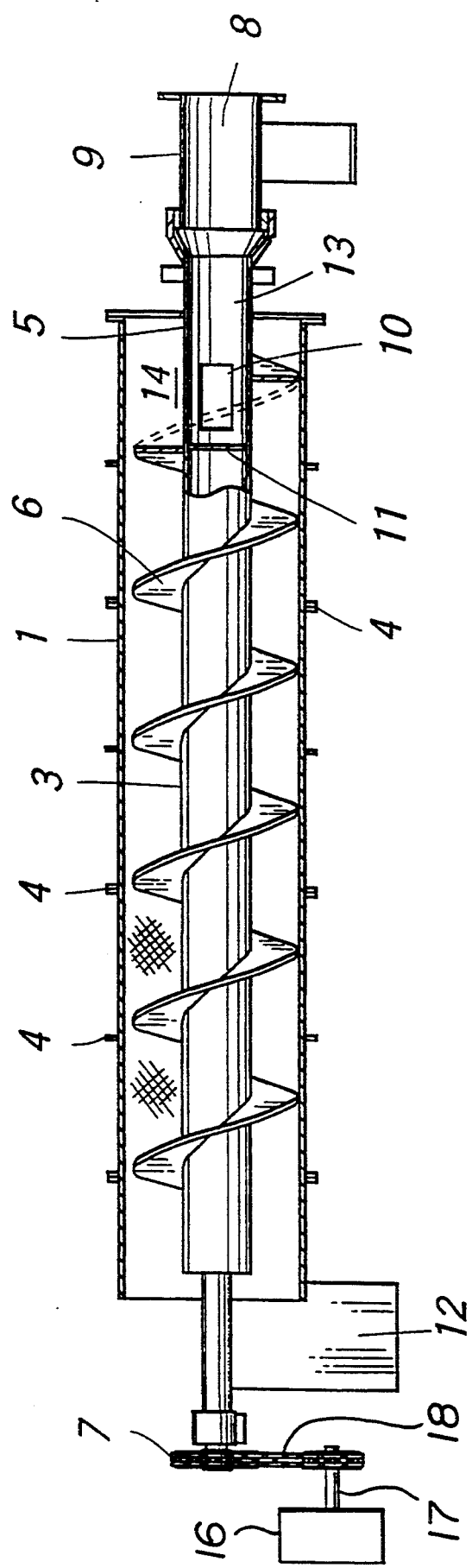
FIG. 1 is a longitudinal cross sectional view showing an embodiment of the rotary filter according to the invention.
Figure 2:
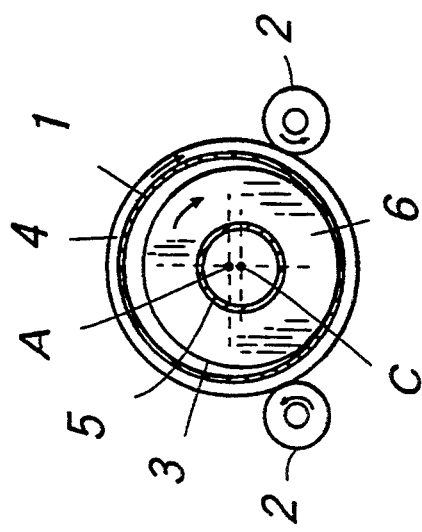
FIG. 2 is a lateral cross sectional view thereof.

FIGS. 1 and 2 illustrate an embodiment of the rotary filter according to the invention. The rotary filter comprises a screen drum 1 formed by shaping a screen plate into the form of a drum. The screen drum 1 is supported by driving shafts 2 such that the screen drum 1 is rotated about its longitudinal axis A. Within the screen drum 1 there is arranged a screw 3. According to the invention, the screw 3 is arranged such that the screw can be rotated independently from the screen drum 1. A number of reinforcing rings 4 are provided on the screen drum 1. The driving shafts 2 are arranged in parallel with the longitudinal axis A under the screen drum 1 and the screen drum is placed on the driving shafts, so that the driving shafts are brought into contact with outer surfaces of the reinforcing rings 4. Therefore, by rotating the driving shafts 2 in directions shown by arrows, it is possible to rotate the screen drum 1 about the longitudinal axis A.

The screw 3 comprises a shaft 5 and a spiral vane 6 secured on the shaft 5. The shaft 5 of the screw 3 is journalled by suitable bearing means not shown, so that the screw is rotated about its longitudinal axis C by an electric motor 16 having an output shaft 17, a sprocket 7 secured to one end of the shaft 5 and an endless chain 18 provided between the output shaft of the electric motor and the sprocket. It should be noted that the screw 3 can be rotated in any direction by driving the motor in any direction.

The shaft 5 is formed by a hollow tube and a raw material supply tube 9 having a supply inlet 8 is coupled with the other end of the shaft 5. In the shaft 5 there is secured a partition 11 to constitute a space 13 which is communicated with the raw material supply tube 9. This space 13 is further communicated with a space 14 between the screen drum 1 and the screw 3 via an opening 10 formed in the shaft 5.

Although not shown in the drawings, above the screen drum 1 there is arranged a water spray tube for washing clogged filtering holes of the screen drum, and under the screen drum there is provided a tray for collecting and discharging the extracted water. A reference numeral 12 denotes a discharging outlet through which the raw material is discharged.

In the rotary filter according to the invention, the screw drum 1 and the screw 3 are rotated independently from each other by means of separate driving sources, so that the rotating speeds and rotating directions of the screen drum and the screw can be adjusted at will independently from each other. In FIG. 2, there is shown a case in which the screen drum 1 and the screw 3 are rotated in the same direction, but they may be rotated in opposite directions. Further the rotating axis A of the screen drum 1 is not always necessary to be coincided with the longitudinal axis C of the screw 3. In the present embodiment, the longitudinal axis A of the screen drum 1 is slightly above the longitudinal axis C of the screw 3.

A water containing raw material is introduced into the rotary filter from the supply inlet 8 of the raw material supply tube 9. Then the raw material is guided into the inner space 13 of the shaft 5 and is further transferred into the space 14 between the screen drum 1 and the screw 3 by means of the opening 10. The raw material is gradually transported toward the discharging outlet 12 due to the rotation of the spiral vane 6 of the screw 3. During this movement, the water is filtered out of the raw material and the water is discharged from the rotary filter via the filtering holes formed in the screen drum 1.

Even when the water filtering efficiency is increased by increasing the rotation speed of the screen drum 1, the transporting speed of the raw material within the screen drum can be adjusted at will by controlling the rotation speed of the screw 3, so that a period of time during which the raw material is remained within the screen drum can be suitably adjusted.

In this manner, in the rotary filter according to the invention, a packing density of the raw material at the discharging outlet 12 can be adjusted at will by suitably determining the rotation speed of the screw 3. For instance, the packing density of the raw material at the discharging outlet 12 may be increased to perform the water extraction to a high degree. Moreover, the supply rate of the raw material at the supply inlet 8 may be set at will. Such features of the rotary filter according to the invention could never be attained by the known rotating filter.

Further, the water containing raw material within the screen drum 1 is subjected to the mechanical filtering operation due to the resistance against the transportation of the raw material within the screen drum caused by the screw 3 which is rotated relative to the screen drum. Together with the adjustment of the time period during which the raw material is remained within the screen drum, this results in that the water filtering efficiency can be increased by several times as compared with the known rotary filter.

As explained above, in the rotary filter according to the invention, a period of time during which the raw material is remained within the screen drum can be adjusted at will in regardless of the rotation speed of the screen drum, so that the rotation speed of the screen drum can be increased to attain a very high filtering efficiency. Moreover, the raw material is subjected to the resistance due to the relative rotation between the screen drum and the screw to perform the additional water filtering. Therefore, the water filtering efficiency can be increased largely.

What is claimed is:

1. A rotary filter for filtering water out of raw material containing water comprising:
   a screen drum arranged rotatably about a longitudinal axis thereof and having first and second ends, said longitudinal axis being arranged substantially horizontally and said screen drum having an inner diameter;
   a screw means arranged rotatably about a longitudinal axis thereof within said screen drum, said screw means having an outer diameter smaller than said inner diameter of said screen drum, said longitudinal axis of said screw means being arranged substantially horizontally and being spaced from said longitudinal axis of said screen drum in a vertical direction such that a lower end of said screw means is brought into contact with a lower end of said screen drum for increasing resistance against transportation of said raw material by said screw means and providing increased water filtering efficiency;
   a raw material supplying means for introducing said raw material into a space formed between said screen drum and said screw means;
   said screw means further including a shaft formed of a hollow tube supporting a single spiral vane arranged about said hollow tube, a partition provided within said hollow tube adjacent said first end of said drum, and an opening provided in said hollow tube between said first end of said drum and said partition, and through said opening said raw material supply means communicates with said space formed between said screen drum and said screw means;
   a first driving means for rotating said screen drum in a first direction at a first rotating speed; and
   a second driving means for rotating said screw means in a second direction which is opposite to said first direction at a second rotating speed which is lower than said first rotating speed to transport said raw material introduced into said space from said first end to said second end of said screen drum,
   wherein said first and second driving means respectively and simultaneously rotate said drum and said screw means at said first and second rotating speeds and can be independently adjusted to respectively rotate said screen drum and said screw means at different speeds relative to each other.

2. A rotary filter according to claim 1, wherein said raw material supplying means comprises a raw material supply tube coupled with said said hollow tube and having a supply inlet.

3. A rotary filter according to claim 2, wherein said first driving means comprises a pair of driving shafts arranged below the screen drum in parallel with said longitudinal axis of the screen drum and a means for rotating said driving shafts, and said screen drum comprises a plurality of reinforcing rings which are placed on said pair of driving shafts.

4. A rotary filter according to claim 1 wherein said second driving means comprises a sprocket secured to an end of said shaft of said screw means, an electric motor having an output shaft and a chain provided between said output shaft of said electric motor and said sprocket.

5. A rotary filter according to claim 1 wherein said raw material supply means only introduces said raw material at said first end of said screen drum, and said second drive means forces dewatered raw material from said space into a discharge outlet arranged at said second end of said screen drum.

* * * * *